(12) United States Patent
Sabharwal et al.

(10) Patent No.: US 10,172,765 B2
(45) Date of Patent: Jan. 8, 2019

(54) METERED DOSE CONTAINER

(71) Applicant: GlaxoSmithKline, LLC, Wilmington, DE (US)

(72) Inventors: Amit Sabharwal, Gurgaon (IN); Sukhdev Singh Saini, Gurgaon (IN)

(73) Assignee: GlaxoSmithKline, LLC, Philadelphia, PA (US)

( * ) Notice: Subject to any disclaimer, the term of this patent is extended or adjusted under 35 U.S.C. 154(b) by 0 days.

(21) Appl. No.: 15/102,564

(22) PCT Filed: Dec. 11, 2014

(86) PCT No.: PCT/US2014/069685
§ 371 (c)(1),
(2) Date: Jun. 8, 2016

(87) PCT Pub. No.: WO2015/089260
PCT Pub. Date: Jun. 18, 2015

(65) Prior Publication Data
US 2016/0302998 A1     Oct. 20, 2016

(30) Foreign Application Priority Data
Dec. 13, 2013 (IN) .......................... 3636/DEL/2013

(51) Int. Cl.
*B65D 5/76* (2006.01)
*A61J 7/00* (2006.01)
(Continued)

(52) U.S. Cl.
CPC ............... *A61J 7/0076* (2013.01); *A61J 1/00* (2013.01); *G01F 11/34* (2013.01)

(58) Field of Classification Search
CPC ............ A61J 7/0076; A61J 1/00; G01F 11/34
(Continued)

(56) References Cited

U.S. PATENT DOCUMENTS 2,309,234 A * 1/1943 Bonander .............. A47G 19/34
                                                          222/456
2,579,083 A * 12/1951 Kramer ................. G01F 11/003
                                                          222/437
(Continued)

FOREIGN PATENT DOCUMENTS

JP           S5314735 U      2/1978

*Primary Examiner* — Patrick M Buechner
*Assistant Examiner* — Michael J Melaragno
(74) *Attorney, Agent, or Firm* — Joshua C. Sanders; Roshni A. Sitapara (57) ABSTRACT

Aspects of the present invention are directed to a metered dose container. The container may comprise a body; a first barrier in contact with a base of the container and extending partially along the vertical axis of the body; a second barrier in contact with a top of the container and extending partially along with vertical axis of the body. The space between the first barrier and the second barrier preferably defines a loading chamber, the space between the second barrier and a front wall of the container preferably defines a dispensing chamber, and the space between a rear wall of the container and the first barrier preferably defines a storage chamber. The base preferably also comprises a depressible portion that can convert the container from a transit mode to a dispensing mode.

8 Claims, 8 Drawing Sheets

FIG. 6

(51) Int. Cl.
   *A61J 1/00* (2006.01)
   *G01F 11/34* (2006.01)
(58) Field of Classification Search
   USPC ......... 222/448, 21, 134, 133, 216, 454, 449,
   222/561, 425, 444, 456
   See application file for complete search history.

(56) References Cited

U.S. PATENT DOCUMENTS

| | | | | |
|---|---|---|---|---|
| 2,619,264 A * | 11/1952 | Sprucinski | ............. | A47G 19/34 222/456 |
| 2,676,734 A * | 4/1954 | Mertens | ................... | A47K 5/10 222/455 |
| 2,778,544 A * | 1/1957 | King | ...................... | A47G 19/34 222/456 |
| 3,022,924 A * | 2/1962 | Wistrand | ............... | A47G 19/34 222/456 |
| 3,134,521 A * | 5/1964 | Van Maasdam | ...... | G01F 11/263 222/443 |
| 5,261,575 A * | 11/1993 | Keller | .................... | G01F 11/28 222/455 |
| 7,032,787 B2 | 4/2006 | Sherk, Jr. | | |
| 2006/0144872 A1 | 7/2006 | Israel | | |
| 2007/0029350 A1* | 2/2007 | Lagace | ................... | G01F 11/40 222/425 |
| 2007/0181614 A1* | 8/2007 | Rvachov | ............... | G01F 11/261 222/456 |
| 2008/0257917 A1 | 10/2008 | Lee | | |
| 2010/0258583 A1* | 10/2010 | Schick | .................. | A61J 7/0076 221/279 |
| 2011/0127297 A1 | 6/2011 | Jennings | | |
| 2011/0266311 A1 | 11/2011 | Nielsen | | |
| 2014/0312075 A1* | 10/2014 | Antal, Sr. | ............... | G01F 11/06 222/464.1 |
| 2015/0136800 A1* | 5/2015 | Dodo | ................. | B65D 83/0409 221/7 |
| 2015/0191294 A1* | 7/2015 | Paz | ....................... | A61J 7/0076 221/9 |
| 2015/0203277 A1* | 7/2015 | Ramachandran | .. | B65D 47/0847 222/425 |

* cited by examiner

METERED DOSE CONTAINER

This application is a 371 of International Application No. PCT/US2014/069685, filed 11 Dec. 2014, which claims the priority of India Application No.: IN 3636/DEL/2013 filed 13 Dec. 2013, which is incorporated herein in its entirety.

TECHNOLOGY FIELD

Aspects of the present invention are directed to a metered dose container, and in particular, a metered dose container that is transit proof.

BACKGROUND

The ability to dispense accurate amounts of dry material from containers has been investigated for several decades. In particular, powders or particles consumed for health or medicinal purposes may often require accurate amounts to be either consumer directly or more often, dissolved in a liquid and then consumed. Current metered dose containers have drawbacks. For example, if the container is inadvertently inverted or dropped during transit, the next dose of material dispensed from the container will have an inaccurate amount of material because additional material has been released into the dispensing chamber of the container. Furthermore, the last dose in the container may have less than the anticipated amount because of the inaccurate amounts dispensed previously. In addition to dispensing inaccurate amounts of material, which could lead to lack of efficacy of the product or adverse side effects because of too much consumption, this inaccurate dosing may also lead to product waste. Thus, a metered dose device that does not suffer from the drawbacks of traditional metered dose containers would be highly desirable.

SUMMARY

Aspects of the present invention are directed to a container comprising a body having a vertical axis; a first barrier in contact with a base of the container and extending partially along the vertical axis of the body; a second barrier in contact with a top of the container and extending partially along with vertical axis of the body. The space between the first barrier and the second barrier defines a loading chamber, the space between the second barrier and a front wall of the container defines a dispensing chamber, and the space between a rear wall of the container and the first barrier defines a storage chamber. The base also comprises a depressible portion that when in a first position can be positioned such that the loading chamber is not in fluid communication with the dispensing chamber and when in a second position the loading chamber is in fluid communication with the dispensing chamber. When in a first position, the container is in "transit mode." When in the second position, the container is in "dispensing mode."

The container may be designed such that a metered amount of material is dispensed from the container when the container is in dispensing mode. In certain embodiments, the metered dose amount may be between about 0.5 g and about 5 g. In other embodiments, the metered dose amount may be between about 0.75 g and about 1.25 g of material.

In certain embodiments, the depressible portion extends along the base from between the first barrier and the front wall. The depressible portion may also include a tab for positioning the depressible portion in the first position or the second position.

The container may also include a cap having a flip top opening. In certain embodiments, the flop top opening is positioned above the dispensing chamber so materials can be dispensed from the dispensing chamber. In other embodiments, the cap may also include a second flip top opening positioned above the storage chamber.

DETAILED DESCRIPTION

Aspects of the present invention are directed to a metered dose container. The metered dose container may have two modes—a transit mode and a dispensing mode. In transit mode, material cannot be dispensed from the container or dosed within the container. For example, if the container is inadvertently knocked over or turned upside down, no material will be dosed within the container and, therefore, the next dispensing of material from the container will have the correct amount of material. In dispensing mode, material can be dosed within the container and dispensed from the container. If certain embodiments of the present invention, the container can be repositioned from dispensing mode to transit mode, for storage purposes.

Metered dose containers of the present invention contain a body having a vertical axis; a first barrier in contact with a top of the container; a second barrier in contact with a top of the container and a base comprising a depressible portion. The first and second barriers may extend along the vertical axis of the container. Inside the body may be the material to be dispensed and the barrier. The space between the first barrier and the second barrier defines a loading chamber, the space between the second barrier and a front wall of the container defines a dispensing chamber, and the space between a rear wall of the container and the first barrier defines a storage chamber. The depressible portion of the base is positionable such that in a first position the loading chamber is not in fluid communication with the dispensing chamber and but when the depressible portion is in a second position the loading chamber is in fluid communication with the dispensing chamber.

Figure 1:
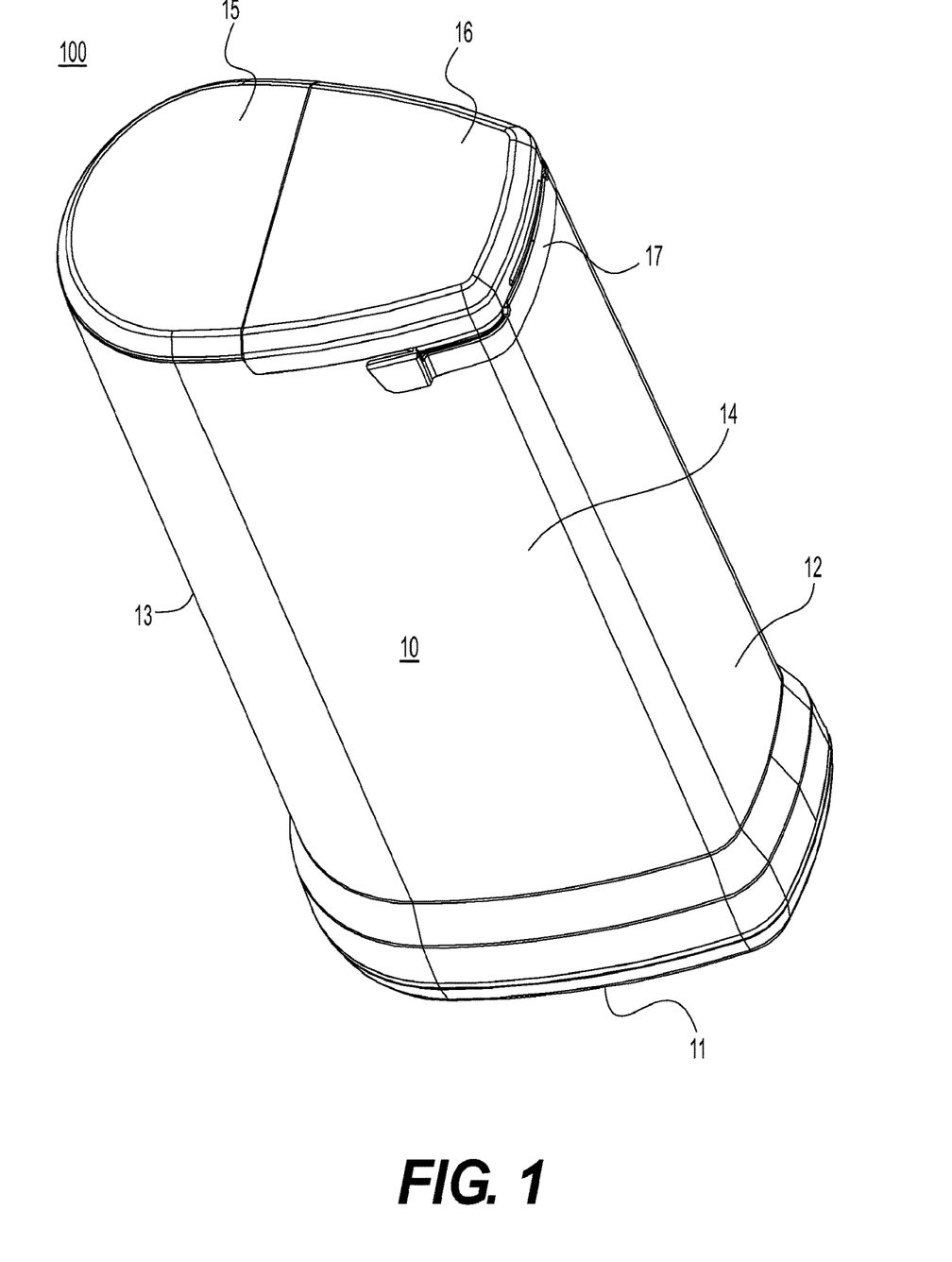
FIG. 1 shows a perspective view of a closed metered dose container.
Figure 2:
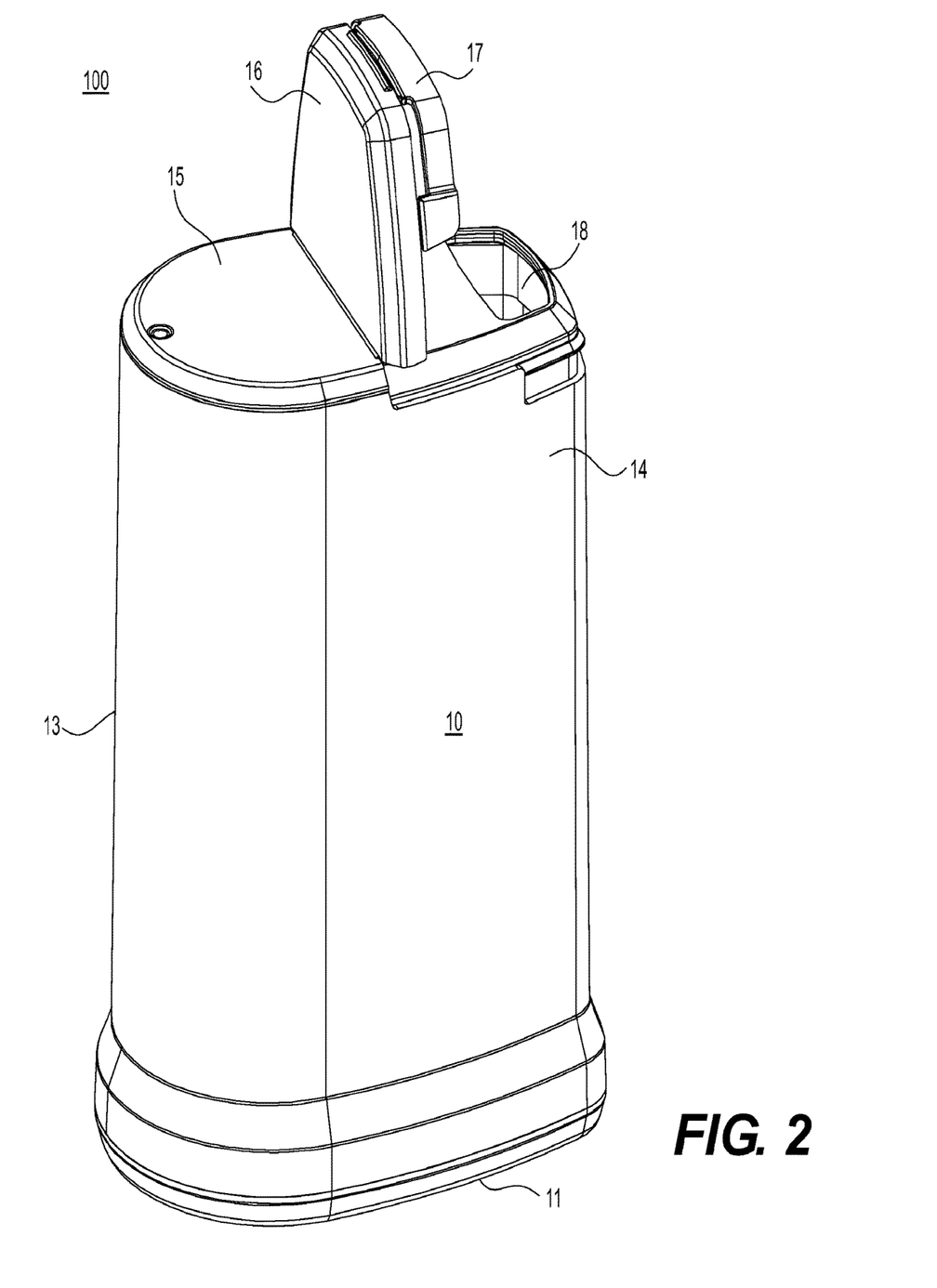
FIG. 2 shows a perspective view of an opened metered dose container.

An embodiment of a metered dose container in transit mode 100 is shown in FIG. 1. In transit mode, the container can be knocked over or upended and the next dispensing of material from the container contains the correct amount of material. Metered dose container in transit mode 100 includes body 10 having bottom 11, front wall 12, rear wall 13, and side walls 14. Body 10 also includes lid 15, flip top 16 and lock 17 attaching flip top 16 and front wall 12 and at least a portion of side walls 14. FIG. 2 shows metered dose container 100 with flip top 16 in the open position to expose opening 18.

Figure 3:
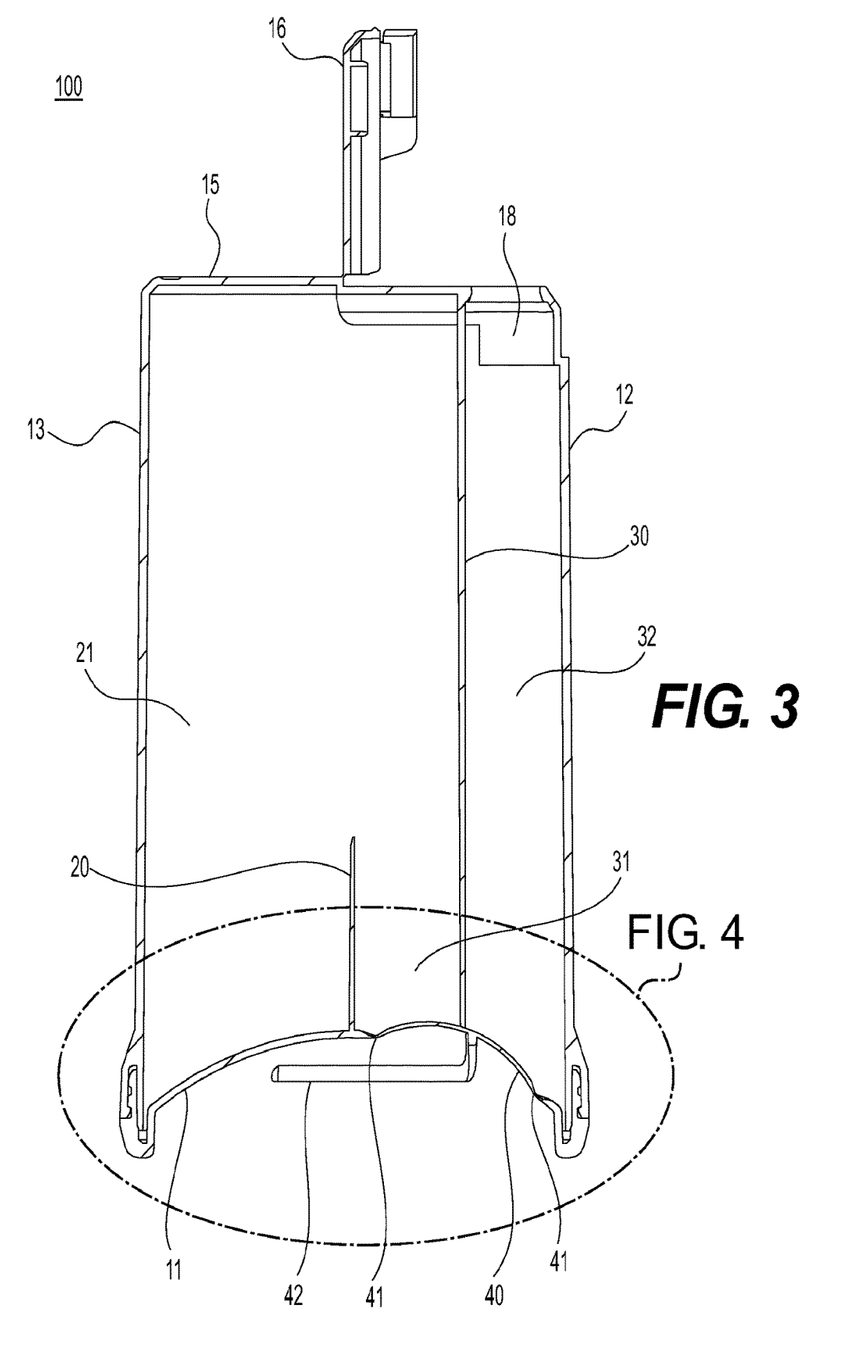
FIG. 3 shows a cross sectional view of a metered dose container in transit mode.
Figure 4:
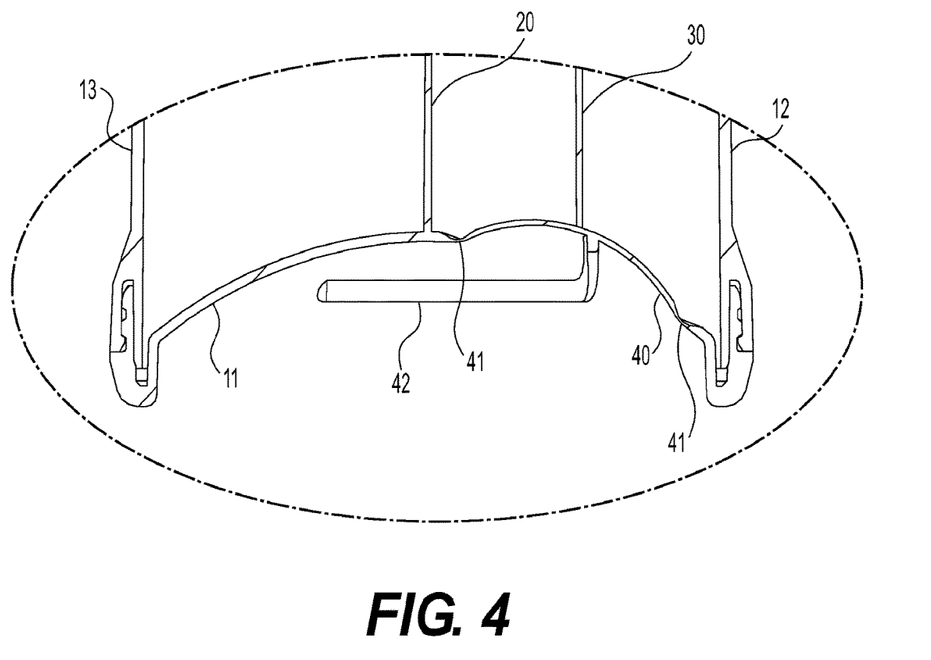
FIG. 4 shows a cross section view of a compressible portion of a metered dose container in transit mode.

A cross sectional view of metered dose container in transit mode 100 is shown in FIG. 3. Inside container 100 is first barrier 20 is attached to base 11 and extending along the vertical axis of container 100. First barrier 20 extends upward from base 11 about 25% of the height of container 100. In other embodiments, first barrier may extend between about 25% and 50% of the height of the container. Storage chamber 21 is defined between rear wall 13 and first barrier 20. Second barrier 30 is attached to top 15 and extends downward along the vertical axis of container 100 but is not attached to bottom 11. Loading chamber 31 is defined between first barrier 20 and second barrier 30.

Dispensing chamber 32 is defined between second barrier 30 and front wall 12. Base 11 contains a depressible portion 40. Depressible portion 40 is defined by boundary 41 which allows depressible portion 40 to be moved in an inward and outward direction by an individual while base 11 remains in place. Depressible portion 40 is situated between first barrier 20 and front wall 12. Depressible portion 40 also includes tab 42 to facilitate the movement of the depressible portion 40 in an inward and outward position or from a first position to a second position or a second position to a first position. FIG. 3 represents depressible portion 40 in an inward or first position. In a first position, depressible portion is in contact with, but not attached to second barrier 30. When depressible portion is in first position, loading chamber 31 and dispensing chamber 32 are not in fluid communication. That means that material from the loading chamber cannot flow into the dispensing chamber. This is characterized as "transit mode."

Figure 5:
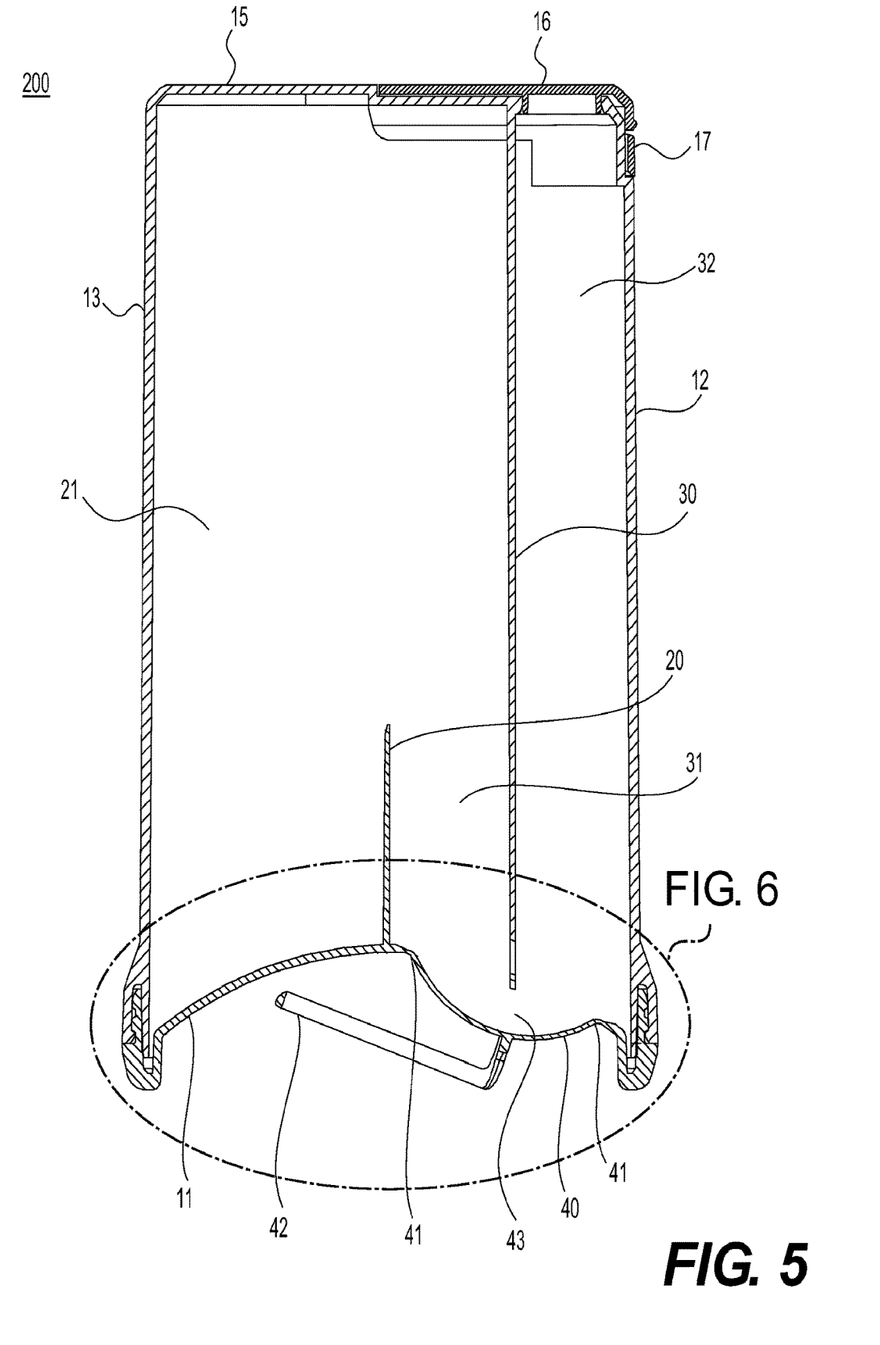
FIG. 5 shows a cross sectional view of a metered dose container in dispensing mode.
Figure 6:
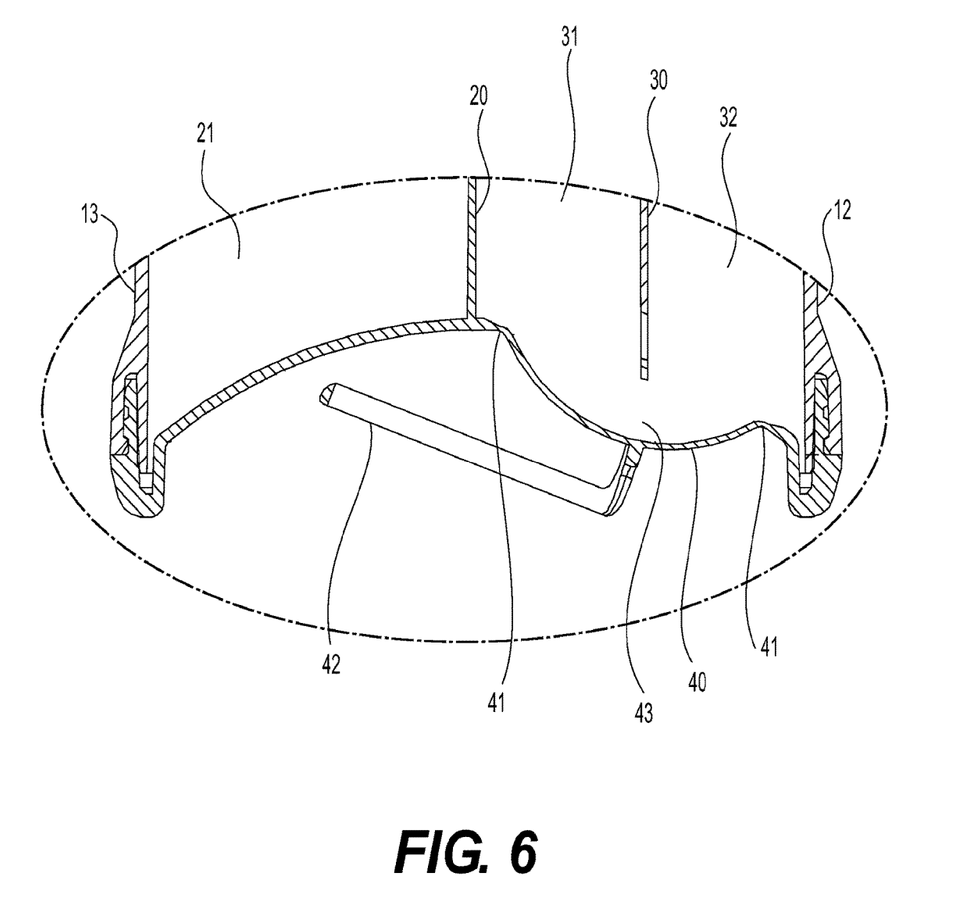
FIG. 6 shows a cross section view of a compressible portion of a metered dose container in dispensing mode.

FIG. 5 shows a cross section view of container 200 in dispensing mode. In dispensing mode, depressible portion 40 of base 11 is in a second position. In second position, depressible portion 40 has been moved outwardly and is no longer in contact with second barrier 30 and dispensing zone 43 is created between depressible portion 40 and second barrier 30. In dispensing mode, loading chamber 31 and dispensing chamber 32 are in fluid communication via dispensing zone 43. As such material can move from loading chamber 31 to dispensing chamber 32 to facilitate dispensing of material from container 100 through opening 18.

Figure 7:
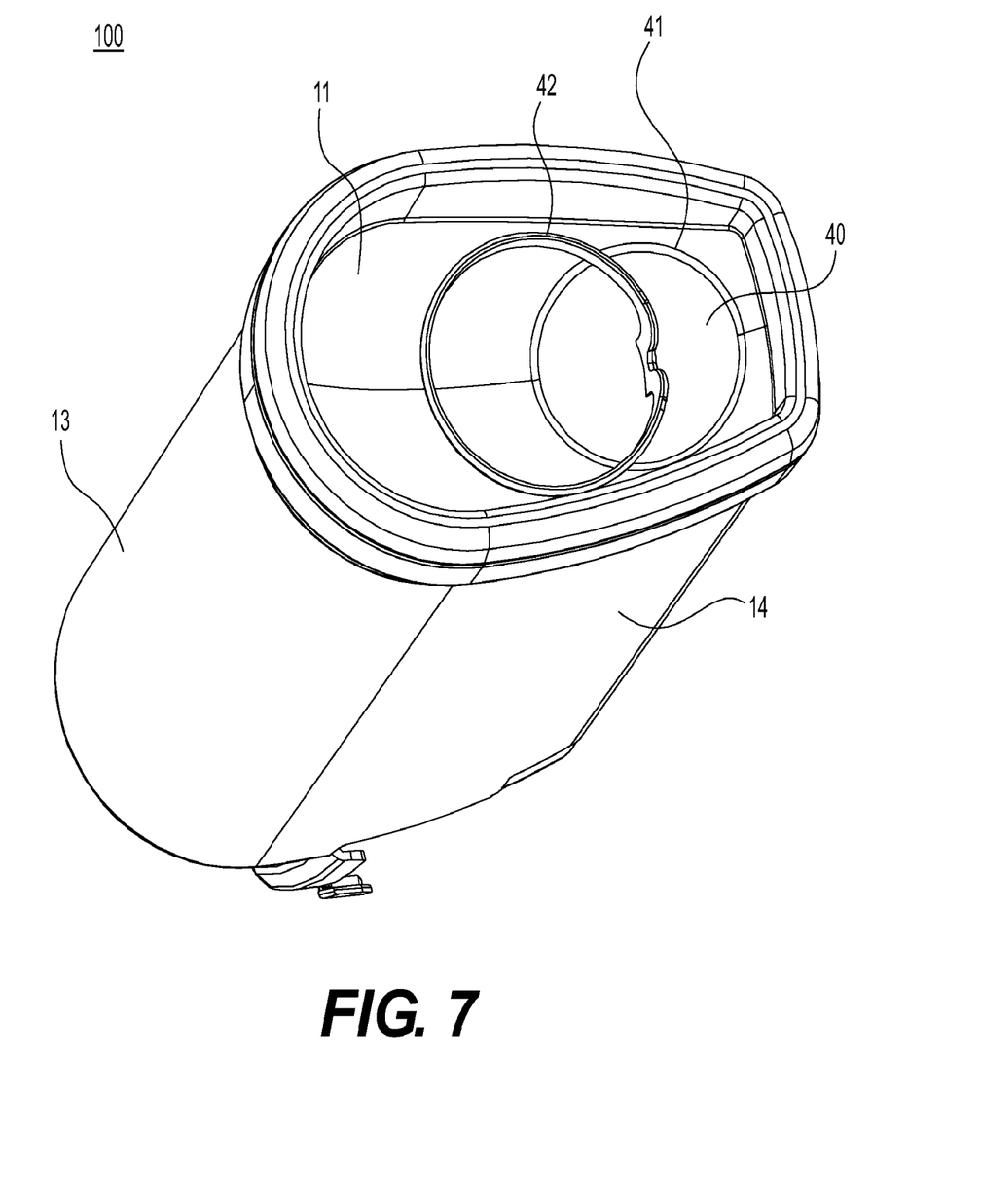
FIG. 7 shows a bottom view of a metered dose container in transit mode.
Figure 8:
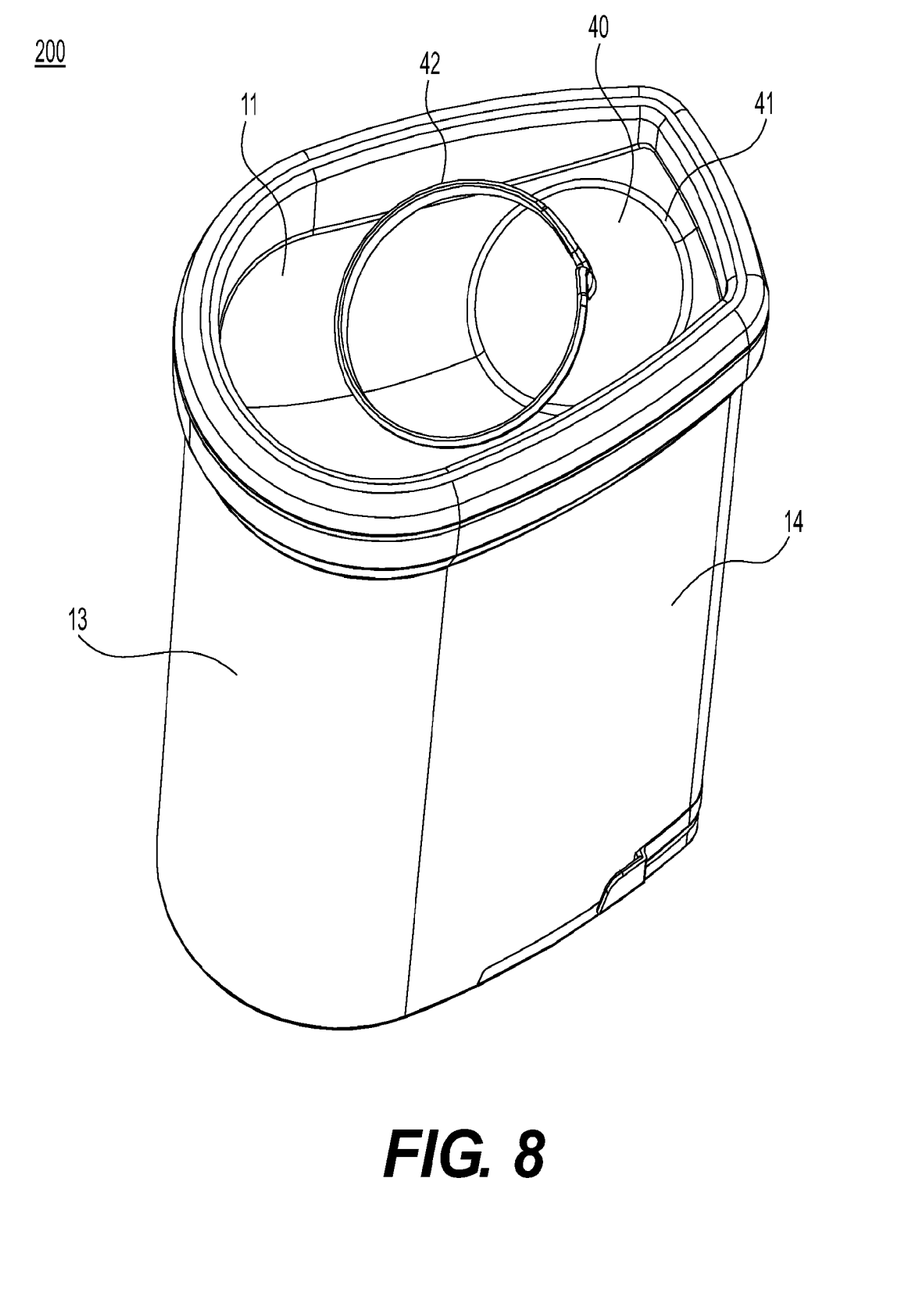
FIG. 8 shows a bottom view of a metered dose container in dispensing mode.

FIGS. 7 and 8 show perspective view of the bottom of container 100 in transit mode (FIG. 7) and dispensing mode (FIG. 8). Tab 42 is a ring that can be grabbed by a user and pulled to move depressible portion 40 from first position or transit mode into second position or dispensing mode. Tab 42 can also be grabbed by a user and pushed to move depressible 40 from second position or dispensing mode into first position or transit mode.

Various materials can be contained within the metered dose container. For example, the material may be powders, powdered/granular beverages, cereals, pulses, salt, pepper, sugar. In a preferred embodiment, the material is a consumer healthcare formulation, such as for example, ENO® (svarjiksara, nimbukamlam).

The container may be designed to hold various amounts of material. For example, the container may hold between about 10 grams and about 2000 grams, preferably between about 50 grams and about 500 grams. In certain embodiments, the container may hold between about 75 grams and about 125 grams of material. In certain embodiments, the container may hold about 100 grams.

When in dispensing mode, the container may be designed such that between about 0.5 grams and about 5 grams of material is dispensed in a single dose. In another embodiment, a single dose may be between about 0.75 and about 1.25 grams. In another embodiment, the container is designed such that a single dose is about 1 gram.

The container may have a total height of between about 8 cm and about 20 cm, a length of between about 4 cm and about 18 cm, and a width of between about 4 cm and about 12 cm. The cap may have a height of between about 2.5 cm and about 7 cm. The removable ring may have a height of between about 3 cm and about 7 cm.

In certain embodiments, the movable cap, removable ring, body, and barrier may be made of the same or different materials. On skilled in the art would recognize the materials that can be used to make the metered dose container. Suitable materials may be Polypropylene, High density polyethylene, Polyethylene terephthalate, wood, metal, coextruded structure, aluminum, glass, Paper, paperboard, synthetic material, nylon. In a preferred embodiment, the material may be Polypropylene.

What is claimed is:

1. A container comprising:
   a body having a vertical axis;
   a first barrier in contact with a base of the container and extending partially along the vertical axis of the body;
   a second barrier in contact with a top of the container and extending partially along the vertical axis of the body;
   wherein the space between the first barrier and the second barrier defines a loading chamber, the space between the second barrier and a front wall of the container defines a dispensing chamber, and the space between a rear wall of the container and the first barrier defines a storage chamber;
   wherein the base comprises a depressible portion that when in a first position can be positioned such that the loading chamber is not in fluid communication with the dispensing chamber and when in a second position the loading chamber is in fluid communication with the dispensing chamber; and
   wherein the depressible portion is defined by a boundary provided between the base and the depressible portion and physically connecting the base and the depressible portion.

2. The container of claim 1, wherein the depressible portion extends along the base from between the first barrier and the front wall.

3. The container of claim 1, wherein the depressible portion further comprises a tab for positioning the depressible portion in the first position or the second position.

4. The container of claim 1, wherein when the depressible portion is in the second position between about 0.5 g and about 5 g of material is transferred from the loading chamber to the dispending chamber.

5. The container of claim 4, wherein when the depressible portion is in the second position between about 0.75 g and about 1.25 g of material is transferred from the loading chamber to the dispending chamber.

6. The container of claim 1, wherein the container comprises a cap having a flip top opening.

7. The container of claim 6, wherein the opening is positioned above the dispensing chamber.

8. The container of claim 7, wherein the cap comprises a second flip top opening positioned above the storage chamber.

* * * * *